United States Patent
Wu (10) Patent No.: US 10,397,891 B2
(45) Date of Patent: Aug. 27, 2019

(54) DEVICE AND METHOD OF HANDLING MULTIPLE CELLULAR RADIO OPERATIONS

(71) Applicant: HTC Corporation, Taoyuan (TW)

(72) Inventor: Chih-Hsiang Wu, Taoyuan (TW)

(73) Assignee: HTC Corporation, Toayuan (TW)

( * ) Notice: Subject to any disclaimer, the term of this patent is extended or adjusted under 35 U.S.C. 154(b) by 51 days.

(21) Appl. No.: 15/662,298

(22) Filed: Jul. 28, 2017

(65) Prior Publication Data

US 2018/0041981 A1 Feb. 8, 2018

Related U.S. Application Data

(60) Provisional application No. 62/369,768, filed on Aug. 2, 2016, provisional application No. 62/419,932, filed on Nov. 9, 2016.

(51) Int. Cl.
| | |
|---|---|
| H04W 60/04 | (2009.01) |
| H04L 5/00 | (2006.01) |
| H04W 72/04 | (2009.01) |
| H04W 8/22 | (2009.01) |
| H04B 7/0413 | (2017.01) |

(52) U.S. Cl.
CPC .......... *H04W 60/04* (2013.01); *H04L 5/0023* (2013.01); *H04W 8/22* (2013.01); *H04W 72/048* (2013.01); *H04B 7/0413* (2013.01); *H04L 5/001* (2013.01)

(58) Field of Classification Search
CPC ..... H04B 7/0413; H04L 5/001; H04L 5/0023; H04W 60/04; H04W 72/048; H04W 8/22
See application file for complete search history.

(56) References Cited

U.S. PATENT DOCUMENTS

| | | | | |
|---|---|---|---|---|
| 9,629,194 | B2 * | 4/2017 | Rahman | H04W 24/02 |
| 2010/0330959 | A1 * | 12/2010 | Mildh | H04W 8/22 |
| | | | | 455/410 |
| 2012/0052911 | A1 * | 3/2012 | Chin | H04W 4/60 |
| | | | | 455/558 |
| 2012/0087257 | A1 * | 4/2012 | Larsson | H04L 5/001 |
| | | | | 370/252 |
| 2012/0258707 | A1 * | 10/2012 | Mathias | H04W 36/30 |
| | | | | 455/426.1 |
| 2013/0288741 | A1 * | 10/2013 | Sjadieh | H04W 76/15 |
| | | | | 455/552.1 |

(Continued)

OTHER PUBLICATIONS

3GPP TS 36.331 V13.2.0, Jun. 2016.
3GPP TS 36.306 V13.2.0, Jun. 2016.

*Primary Examiner* — Kashif Siddiqui
(74) *Attorney, Agent, or Firm* — Winston Hsu (57) ABSTRACT

A communication device for handling multiple cellular radio operations in a wireless communication system comprises a storage device for storing instructions and a processing circuit coupled to the storage device. The processing circuit is configured to execute the instructions stored in the storage device. The instructions comprise transmitting a first user equipment (UE) capability to a first network, when the communication device attaches to the first network; and transmitting a second UE capability to the first network, when the communication device attaches to the first network and a second network, wherein the second UE capability is different from the first UE capability.

17 Claims, 7 Drawing Sheets

(56) References Cited

U.S. PATENT DOCUMENTS

| | | | |
|---|---|---|---|
| 2014/0198680 A1* | 7/2014 | Siomina | H04L 5/14 |
| | | | 370/252 |
| 2015/0011236 A1* | 1/2015 | Kazmi | H04B 17/27 |
| | | | 455/456.1 |
| 2016/0157228 A1* | 6/2016 | Yum | H04W 76/27 |
| | | | 370/329 |
| 2016/0262144 A1* | 9/2016 | Kitazoe | H04L 5/0057 |

* cited by examiner

DEVICE AND METHOD OF HANDLING MULTIPLE CELLULAR RADIO OPERATIONS

CROSS REFERENCE TO RELATED APPLICATIONS

This application claims the benefit of U.S. Provisional Applications No. 62/369,768, filed on Aug. 2, 2016, and No. 62/419,932, filed on Nov. 9, 2016, which are incorporated herein by reference.

BACKGROUND OF THE INVENTION

1. Field of the Invention

The present invention relates to a device and a method used in a wireless communication system, and more particularly, to a device and a method of handling multiple cellular radio operations in a wireless communication system.

2. Description of the Prior Art

A long-term evolution (LTE) system (including an evolution of the LTE system such as a LTE-Advanced (LTE-A) system and a LTE-Advanced Pro system, etc.) supports carrier aggregation (CA), dual connectivity (DC), a LTE transmission over an unlicensed spectrum (e.g., LTE-unlicensed (LTE-U) or licensed-assisted access (LAA)).

SUMMARY OF THE INVENTION

The present invention therefore provides a communication device and method for handling multiple cellular radio operations in a wireless communication system to solve the abovementioned problem.

A communication device for handling multiple cellular radio operations in a wireless communication system comprises a storage device for storing instructions and a processing circuit coupled to the storage device. The processing circuit is configured to execute the instructions stored in the storage device. The instructions comprise transmitting a first user equipment (UE) capability to a first network, when the communication device attaches to the first network; and transmitting a second UE capability to the first network, when the communication device attaches to the first network and a second network, wherein the second UE capability is different from the first UE capability.

A communication device for handling multiple cellular radio operations in a wireless communication system comprises a storage device for storing instructions and a processing circuit coupled to the storage device. The processing circuit is configured to execute the instructions stored in the storage device. The instructions comprise transmitting a first UE capability to a first network, when the communication device attaches to the first network, wherein the first UE capability indicates that the communication device supports a carrier aggregation (CA); and transmitting a second UE capability to the first network and a second network, when the communication device attaches to the first network and the second network, wherein the second UE capability indicates that the communication device does not support the CA.

A communication device for handling multiple cellular radio operations in a wireless communication system comprises a storage device for storing instructions and a processing circuit coupled to the storage device. The processing circuit is configured to execute the instructions stored in the storage device. The instructions comprise transmitting a first multiple input multiple output (MIMO) capability to a first network, when the communication device attaches to the first network; and transmitting a second MIMO capability to the first network, when the communication device attaches to the first network and a second network, wherein the second MIMO capability is different from the first MIMO capability.

A communication device for handling multiple cellular radio operations in a wireless communication system comprises a storage device for storing instructions and a processing circuit coupled to the storage device. The processing circuit is configured to execute the instructions stored in the storage device. The instructions comprise transmitting a first UE category to a first network, when the UE attaches to the first network; and transmitting a second UE category to the first network, when the UE attaches to the first network and a second network, wherein the second UE category is different from the first UE category.

A method for handling multiple cellular radio operations of a communication device in a wireless communication system comprises transmitting a first user equipment (UE) capability to a first network, when the communication device attaches to the first network; and transmitting a second UE capability to the first network, when the communication device attaches to the first network and a second network, wherein the second UE capability is different from the first UE capability.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
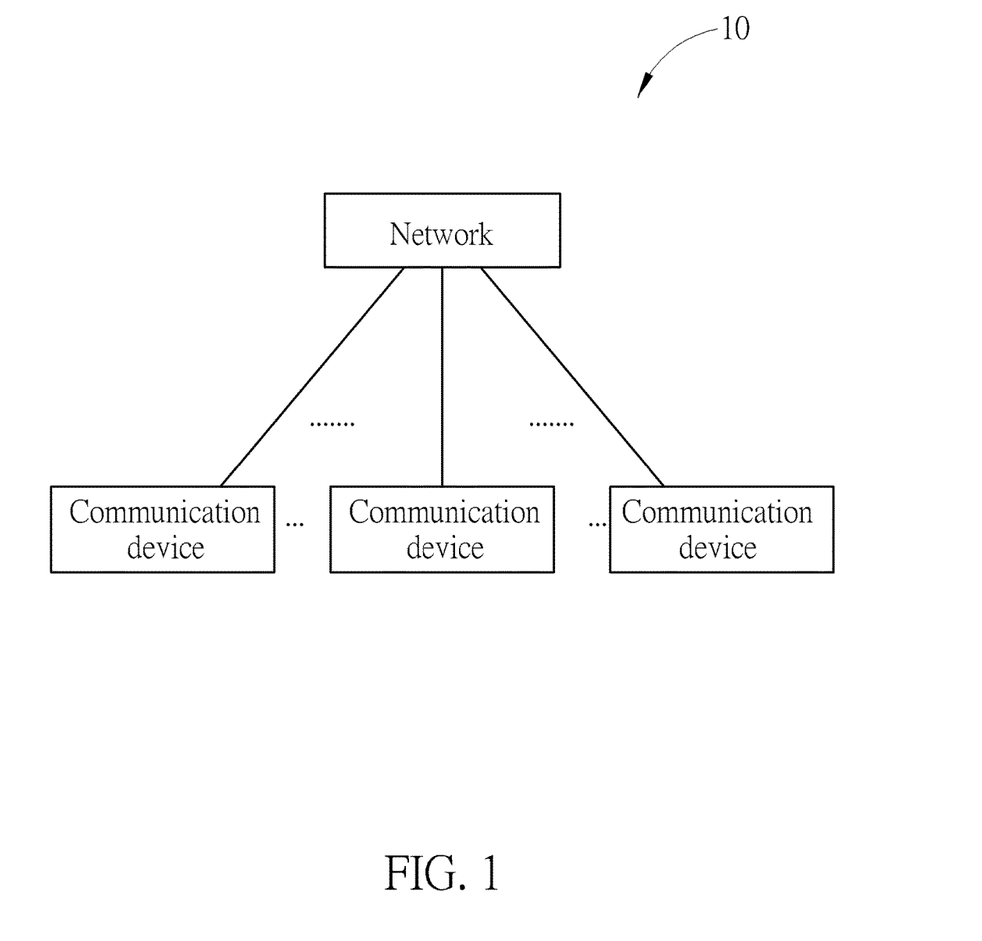
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) belonging to multiple base stations (BSs). The abovementioned cells may be operated in the same or different duplexing modes, e.g., frequency-division duplexing (FDD), time-division duplexing (TDD) or flexible duplexing.

In FIG. 1, the network and the communication devices are simply utilized for illustrating the structure of the wireless communication system 10. The network may include a radio access network including at least one base station (BS). In general, a BS in the at least one BS may be an evolved Node-B (eNB) or a fifth generation (5G) BS. Furthermore, the network may also include a core network, wherein the core network may include network entities, e.g., Mobility Management Entity (MME), Serving Gateway (S-GW), etc.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
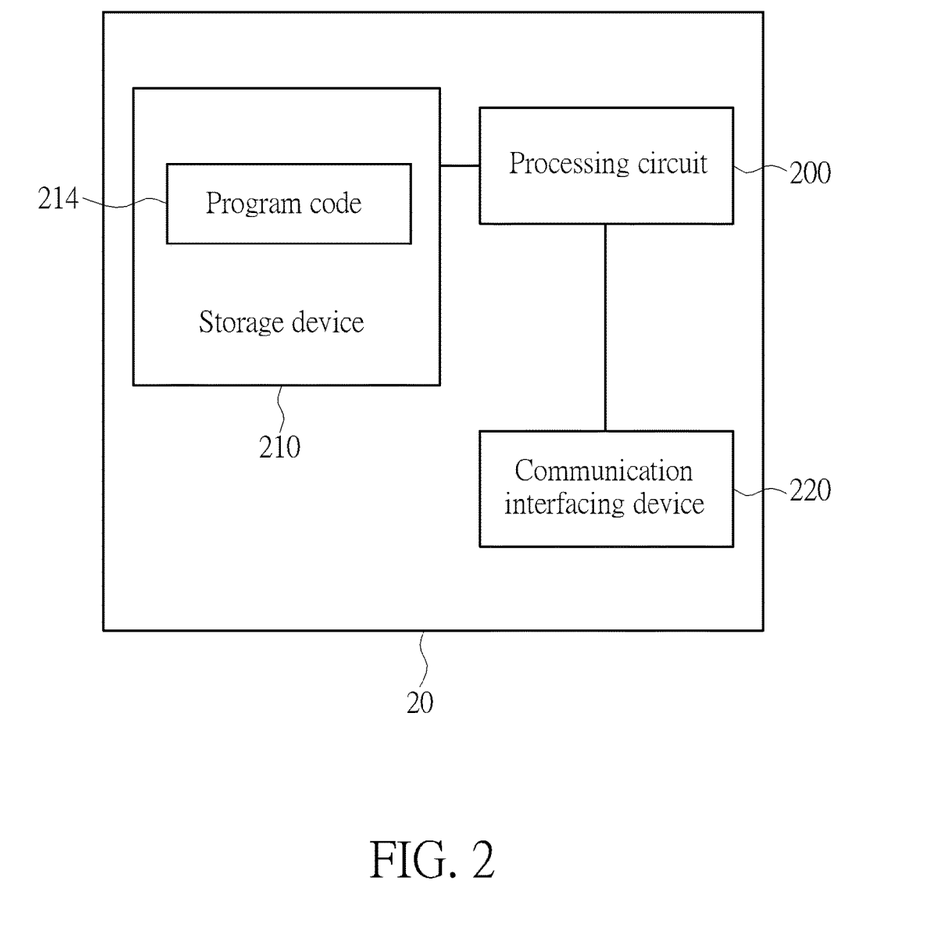
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
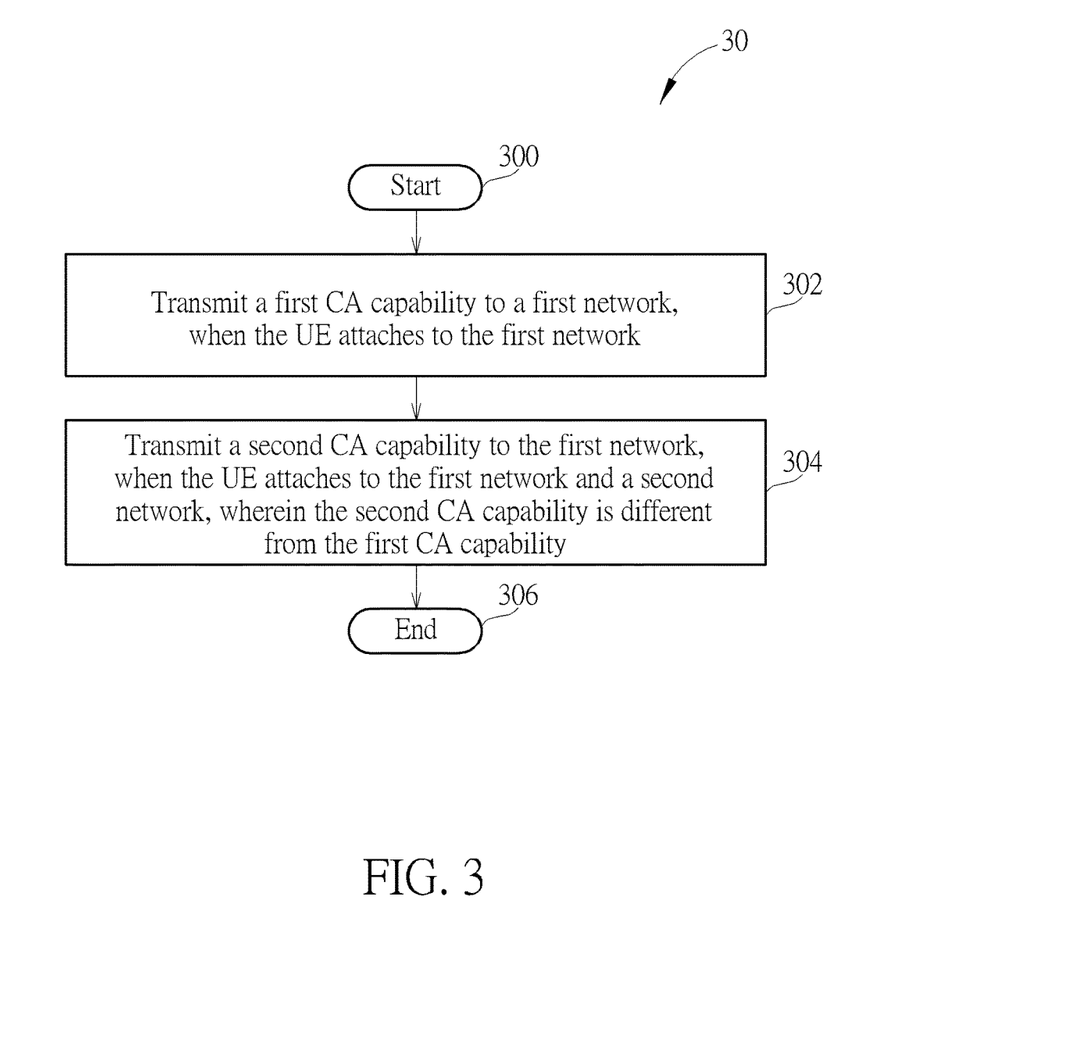
FIG. 3 is a flowchart of a process according to an example of the present invention.

FIG. 3 is a flowchart of a process 30 according to an example of the present invention. The process 30 may be utilized in a UE, to transmit a carrier aggregation (CA) capability, and includes the following steps:

Step 300: Start.

Step 302: Transmit a first CA capability to a first network, when the UE attaches to the first network.

Step 304: Transmit a second CA capability to the first network, when the UE attaches to the first network and a second network, wherein the second CA capability is different from the first CA capability.

Step 306: End.

Realization of the process 30 is not limited to the above description. The following examples may be applied to the process 30.

In one example, the first CA capability indicates a first maximum number of component carriers (CCs) on which the UE can simultaneously receive transmission(s) for CA, and the second CA capability indicates a second maximum number of CCs on which the UE can simultaneously receive transmission(s) for CA. In one example, the first maximum number is greater than the second maximum number, and the second maximum number is greater than 1. In one example, the first maximum number is configured by the UE according to a radio frequency (RF) capability of the UE. For example, the first maximum number is 3 according to the RF capability. When the UE attaches to a first LTE network, the UE transmits a first UE-EUTRA-Capability indicating 3 DL CCs for the CA (e.g., in a SupportedBandCombination information element (IE)) to the first LTE network. When the UE attaches to the first network and a second LTE network, the UE transmits a second UE-EUTRA-Capability indicating 2 DL CCs of the 3 DL CCs for the CA (e.g., in the SupportedBandCombination IE) to the first LTE network.

In one example, the first CA capability indicates a third maximum number of CCs on which the UE can simultaneously transmit transmission(s) for the CA, and the second CA capability indicates a fourth maximum number of CCs on which the UE can simultaneously transmit transmission(s) for the CA. In one example, the third maximum number is equal to or greater than the fourth maximum number, and the fourth maximum number is equal to or greater than 1. For example, the third maximum number is 2 according to the RF capability. When the UE attaches to the first network, the UE transmits a third UE-EUTRA-Capability indicating 2 UL CCs for the CA (e.g., in the SupportedBandCombination IE) to the first LTE network. When the UE attaches to the first network and the second LTE network, the UE transmits a fourth UE-EUTRA-Capability indicating 1 UL CC of the 2 UL CCs for the CA (e.g., in the SupportedBandCombination IE) to the first LTE network. It should be noted that the SupportedBandCombination IE may be included in the first UE-EUTRA-Capability or the second UE-EUTRA-Capability.

In one example, the first UE capability indicates a first maximum number of multiple input multiple output (MIMO) layers for DL, and the second UE capability indicates a second maximum number of MIMO layers for DL, wherein the first maximum number is greater than the second maximum number. In one example, the first UE capability indicates a first UE category, and the second UE capability indicates a second UE category, wherein the second UE category indicates a lower capability than that of the first UE category. In one example, the UE may transmit a third UE capability to the second network, when the communication device attaches to the first network and the second network, wherein the third UE capability indicates a lower capability than that of the first UE capability.

In one example, the UE (determines to) attaches to the first network according to a first universal subscriber identity module (USIM), and (determines to) attaches to the second network according to a second USIM which has an IMSI different from the first USIM.

In one example, the UE transmits a first ATTACH REQUEST message or a first TRACKING AREA UPDATE REQUEST message to the first network to attach to the first network, and transmits a second ATTACH REQUEST message or a second TRACKING AREA UPDATE REQUEST message to the second network to attach to the second network.

Figure 4:
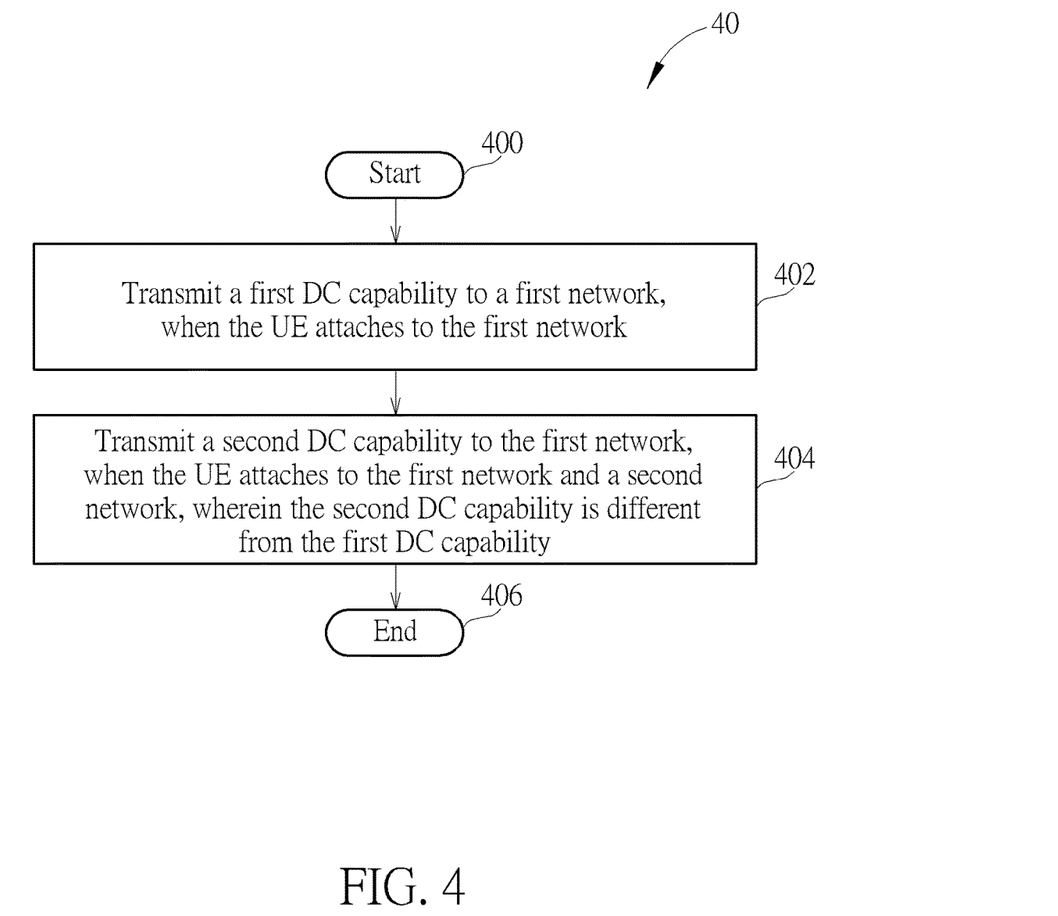
FIG. 4 is a flowchart of a process according to an example of the present invention.

FIG. 4 is a flowchart of a process 40 according to an example of the present invention. The process 40 may be utilized in a UE, to transmit a dual connectivity (DC) capability, and includes the following steps:

Step 400: Start.

Step 402: Transmit a first DC capability to a first network, when the UE attaches to the first network.

Step 404: Transmit a second DC capability to the first network, when the UE attaches to the first network and a second network, wherein the second DC capability is different from the first DC capability.

Step 406: End.

Realization of the process 40 is not limited to the above description. The following examples may be applied to the process 40.

In one example, the first DC capability indicates a first maximum number of CCs on which the UE can simultaneously receive transmissions for DC, and the second DC capability indicates a second maximum number of CCs on which the UE can simultaneously receive transmissions for DC. In one example, the first maximum number is greater than the second maximum number, and the second maximum number is greater than 1. In one example, the first maximum number is configured by the UE according to a RF capability of the UE. For example, the first maximum number is 3 according to the RF capability. When the UE attaches to a first LTE network, the UE transmits a first UE-EUTRA-Capability indicating 3 DL CCs for the DC (e.g., in a SupportedBandCombination IE) to the first LTE network. When the UE attaches to the first network and a second LTE network, the UE transmits a second UE-EUTRA-Capability indicating 2 DL CCs of the 3 DL CCs for the DC (e.g., in the SupportedBandCombination IE) to the first LTE network.

In one example, the first DC capability indicates a third maximum number of CCs on which the UE can simultaneously transmit transmission(s) for the DC, and the second DC capability indicates a fourth maximum number of CCs on which the UE can simultaneously transmit transmission(s) for the DC. In one example, the third maximum number is equal to or greater than the fourth maximum number, and the fourth maximum number is equal to or greater than 1. For example, the third maximum number is 3 according to the RF capability. When the UE attaches to the first LTE network, the UE transmits a third UE-EUTRA-Capability indicating 3 UL CCs for the DC (e.g., in the SupportedBandCombination IE) to the first LTE network. When the UE attaches to the LTE first network and the second LTE network, the UE transmits a fourth UE-EUTRA-Capability indicating 2 UL CC of the 3 UL CCs for the DC (e.g., in the SupportedBandCombination IE) to the first LTE network. It should be noted that the SupportedBandCombination information element may be included in the first UE-EUTRA-Capability or the second UE-EUTRA-Capability.

In one example, the first UE capability indicates a first maximum number of MIMO layers for DL, and the second UE capability indicates a second maximum number of MIMO layers for DL, wherein the first maximum number is greater than the second maximum number. In one example, the first UE capability indicates a first UE category, and the second UE capability indicates a second UE category, wherein the second UE category indicates a lower capability than that of the first UE category. In one example, the UE may transmit a third UE capability to the second network, when the communication device attaches to the first network and the second network, wherein the third UE capability indicates a lower capability than that of the first UE capability.

In one example, the UE (determines to) attaches to the first network according to a first USIM, and (determines to) attaches to the second network according to a second USIM which has an IMSI different from the first USIM.

In one example, the UE transmits a first ATTACH REQUEST message or a first TRACKING AREA UPDATE REQUEST message to the first network to attach to the first network, transmits a second ATTACH REQUEST message or a second TRACKING AREA UPDATE REQUEST message to the second network to attach to the second network.

Figure 5:
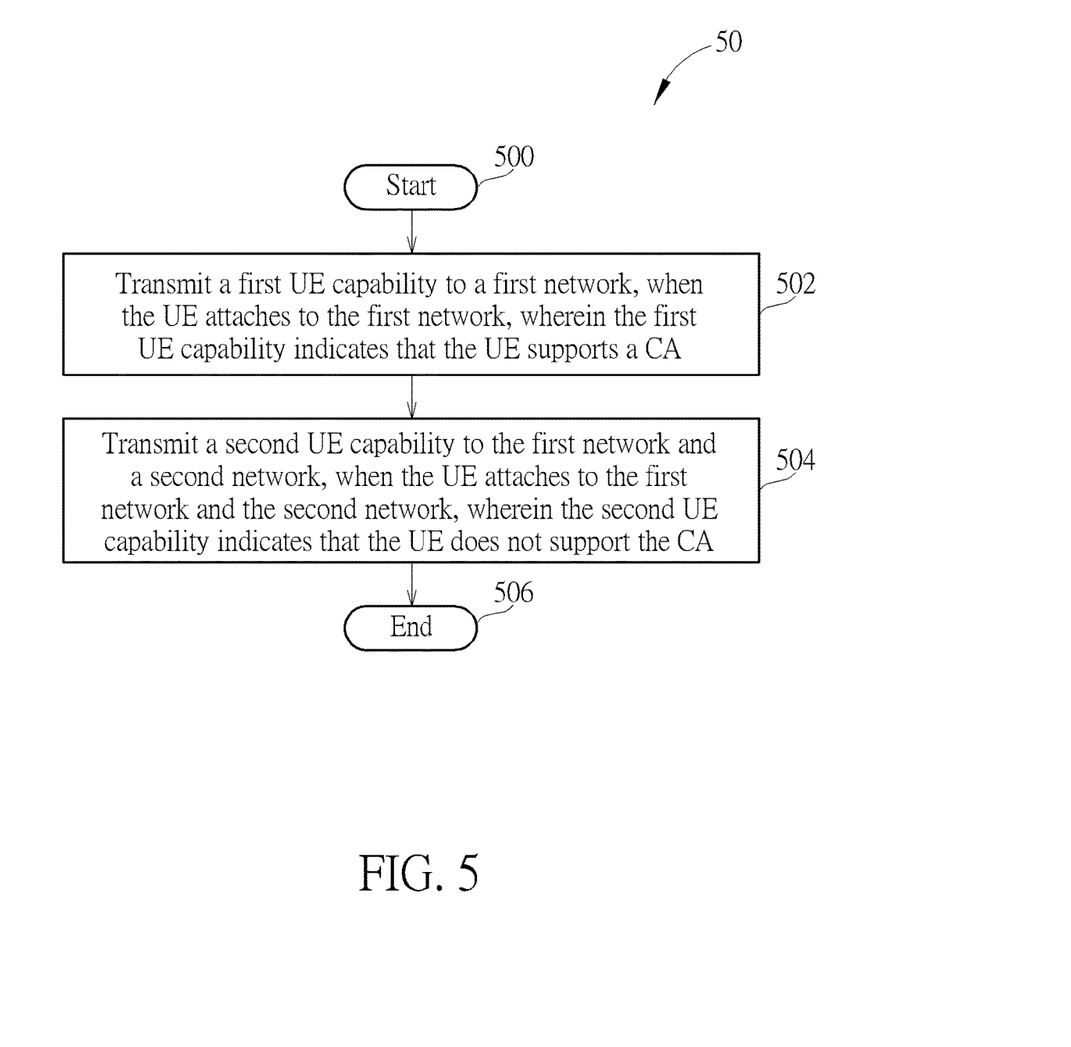
FIG. 5 is a flowchart of a process according to an example of the present invention.

FIG. 5 is a flowchart of a process 50 according to an example of the present invention. The process 50 may be utilized in a UE, to transmit a UE capability, and includes the following steps:

Step 500: Start.

Step 502: Transmit a first UE capability to a first network, when the UE attaches to the first network, wherein the first UE capability indicates that the UE supports a CA.

Step 504: Transmit a second UE capability to the first network and a second network, when the UE attaches to the first network and the second network, wherein the second UE capability indicates that the UE does not support the CA.

Step 506: End.

In one example, the second UE capability does not include a CA capability and a DC capability. In one example, the second UE capability includes a CA capability or a DC capability (e.g., in a SupportedBandCombination IE) which indicates that a maximum number of CCs on which the UE can simultaneously receive transmission(s) is 1 and a maximum number of CCs on which the UE can simultaneously transmit transmission(s) is 1. In one example, the first UE capability indicates a first maximum number of CCs on which the UE can simultaneously receive transmissions for CA or DC. In one example, the first UE capability indicates a second maximum number of CCs on which a transmission is simultaneously supported for the CA or the DC (e.g., transmission(s) can simultaneously be performed). In one example, the first maximum number is greater than 1, and the second maximum number is equal to or greater than 1. In one example, the first maximum number and the second maximum number are configured by the UE according to a RF capability of the UE. For example, the first maximum number is 2, and the second maximum number is 2. When the UE attaches to a first LTE network, the UE transmits a first UE-EUTRA-Capability indicating 2 DL CCs for CA or DC (e.g., in a SupportedBandCombination IE) and 2 UL CCs for CA to the first LTE network (e.g., in the SupportedBandCombination IE). Alternatively, the first UE-EUTRA-Capability indicates 1 UL CC for the CA to the first LTE network. That is, the UE indicates that it supports DL CA but does not support UL CA. When the UE attaches to the first LTE network and a second LTE network, the UE transmits a second UE-EUTRA-Capability indicating that neither the CA nor the DC is supported to the first LTE network. It should be noted that the SupportedBandCombination IE is included in the first UE-EUTRA-Capability or the second UE-EUTRA-Capability.

Realization of the processes 30-50 is not limited to the above description. The following examples may be used for illustrating the processes 30-50.

When the first network receives a CA capability or a DC capability, the first network configures the CA or the DC to the UE according to the CA capability or the DC capability. That is, the first network configures the UE to simultaneously transmit or receive packet (s) (e.g., data) on CCs of which the number is not greater than maximum CCs indicated in the CA capability or the DC capability.

Figure 6:
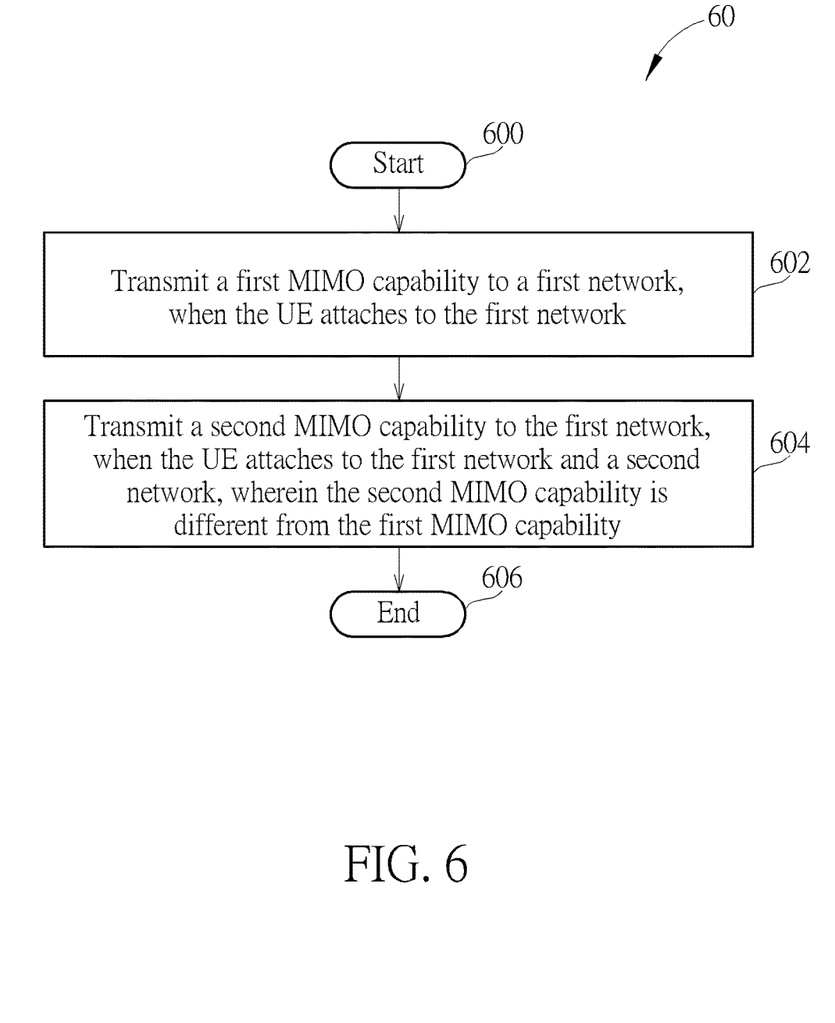
FIG. 6 is a flowchart of a process according to an example of the present invention.

FIG. 6 is a flowchart of a process 60 according to an example of the present invention. The process 60 may be utilized in a UE, to transmit a CA capability, and includes the following steps:

Step 600: Start.

Step 602: Transmit a first multiple input multiple output (MIMO) capability to a first network, when the UE attaches to the first network.

Step 604: Transmit a second MIMO capability to the first network, when the UE attaches to the first network and a second network, wherein the second MIMO capability is different from the first MIMO capability.

Step 606: End.

In one example, the first MIMO capability indicates a first maximum number of MIMO layers for a DL (or a UL), and the second MIMO capability indicates a second maximum number of MIMO layers for the DL (or the UL). In one example, the first maximum number is greater than the second maximum number, and the second maximum number is greater than 1. In one example, the first maximum number is configured by the UE according to at least one of a RF capability and a baseband capability of the UE. For example, the UE is capable of 4 MIMO layers for the DL (or the UL). When the UE attaches to a first LTE network, the UE transmits a first UE-EUTRA-Capability indicating support of the 4 MIMO layers for the DL (or the UL) to the first LTE network. When the UE attaches to the first LTE network and a second LTE network, the UE transmits a second UE-EUTRA-Capability indicating support of 2 MIMO layers for the DL or the UL to the first LTE network.

It should be noted that maximum MIMO layer (s) supported by the UE may be 1 (i.e., MIMO is not supported), 2, 4, 8, 16 or 64. The UE may support the MIMO for the DL but may not support the MIMO for the UL. In one example, the MIMO capability is included in the CA capability or a DC capability. For example, the MIMO capability may be in a band combination in the CA capability or the DC capability.

In one example, the UE (determines to) attaches to the first network according to a first USIM, and (determines to) attaches to the second network according to a second USIM which has an IMSI different from the first USIM.

In one example, the UE transmits a first ATTACH REQUEST message or a first TRACKING AREA UPDATE REQUEST message to the first network to attach to the first network, and transmits a second ATTACH REQUEST message or a second TRACKING AREA UPDATE REQUEST message to the second network to attach to the second network.

Figure 7:
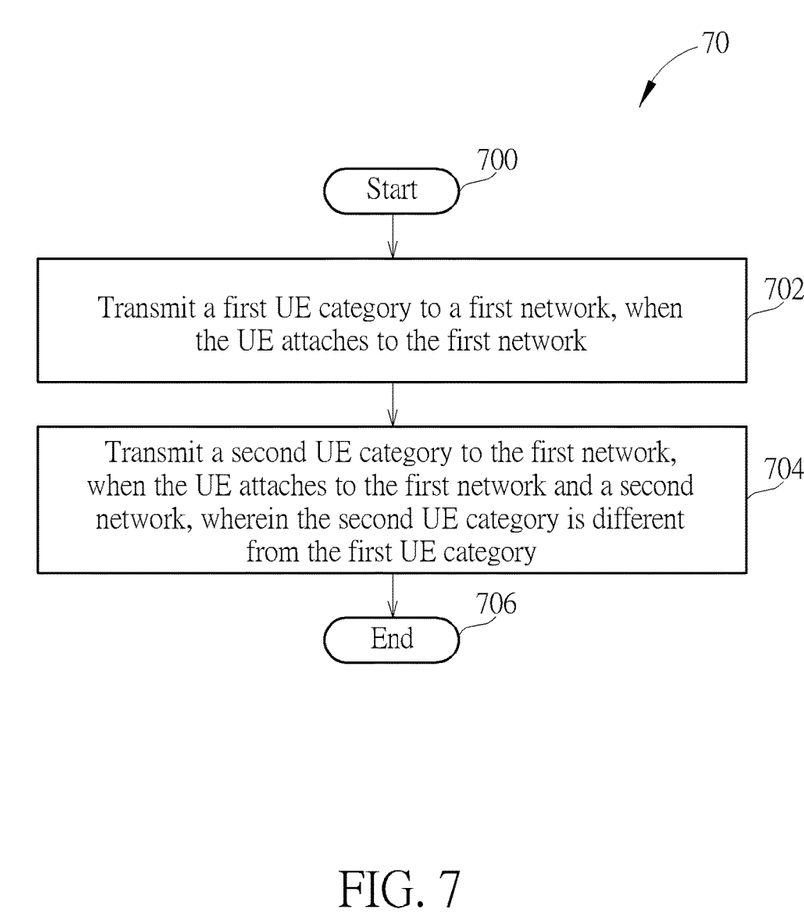
FIG. 7 is a flowchart of a process according to an example of the present invention.

FIG. 7 is a flowchart of a process 70 according to an example of the present invention. The process 70 may be utilized in a UE, to transmit a UE category, and includes the following steps:

Step 700: Start.

Step 702: Transmit a first UE category to a first network, when the UE attaches to the first network.

Step 704: Transmit a second UE category to the first network, when the UE attaches to the first network and a second network, wherein the second UE category is different from the first UE category.

Step 706: End.

Preferably, the second UE category may indicate a lower capability than that of the first UE category. The UE may transmit a third UE category to the second network when the UE attaches to the first network and the second network, wherein the third UE category is different from the first UE category. Preferably, the third UE category may indicate a lower capability than that of the first UE category.

The first UE category may be the highest UE category where the UE is capable to communicate with the first network, when the UE (e.g.) attaches to the first network. The second UE category may be the highest UE category where the UE is capable to communicate with the first network, when the UE attaches to the first network and the second network. The third UE category may be the highest UE category where the UE is capable to communicate with the second network, when the UE attaches to the first network and the second network.

The first UE category may be the highest UE category where the UE is capable to communicate with the first network, when the UE (e.g., only) operates a single radio stack (e.g. single LTE/5G stack) to communicate with the first network. The second UE category may be the highest UE category where the UE is capable to communicate with the first network, when the UE operates two radio stacks (e.g. two LTE/5G stacks) to communicate with the first and second networks. The third UE category may be the highest UE category where the UE is capable to communicate with the second network, when the UE operates two radio stacks (e.g. two LTE/5G stacks) to communicate with the first network and the second network.

In one example, each of the first UE category, the second UE category and the third UE category may comprise a DL category, a UL category or a single category indicating combination of the DL category and the UL category.

In one example, the first UE category is category 12, the second UE category is category 9 and the third UE category is category 4. In one example, the first UE category is category 12, the second UE category is category 6 and the third UE category is category 6. In one example, the first UE category is DL category 12, the second UE category is DL category 9 and the third UE category is DL category 4. In one example, the first UE category is DL category 12, the second UE category is DL category 6 and the third UE category is DL category 6. In one example, the first UE category is UL category 13, the second UE category is UL category 5 and the third UE category is UL category 5.

In one example, the UE transmits the first UE category in a first UE Capability IE (e.g. UE-EUTRA-Capability for LTE or UE-5G-Capability for 5G) to the first network. The UE may transmit a first message including the first UE Capability IE to the first network. The UE may transmit the second UE category in a second UE Capability IE (e.g. UE-EUTRA-Capability for LTE or UE-5G-Capability for 5G) to the first network. The UE may transmit a second message including the second UE Capability IE to the first network. The UE may transmit the third UE category in a third UE Capability IE (e.g. UE-EUTRA-Capability for LTE or UE-5G-Capability for 5G) to the second network, when the UE attaches to the first network and the second network. The UE may transmit a third message including the third UE Capability IE to the second network. The first and second networks may be LTE or 5G networks. The first/second/third messages may be Radio Resource Control (RRC) messages or Non-Access Stratum (NAS) messages. In one example, the RRC message is a UE Capability Information message or a UE Capability Indication message. The NAS message is an ATTACH REQUEST, ATTACH COMPLETE, TRACKING AREA UPDATE REQUEST or TRACKING AREA UPDATE ACCEPT message.

According to the processes 30-70, the UE transmits a first UE capability to a first network, when the UE (e.g., only) attaches to the first network. Then, the UE transmits a second UE capability to the first network, when the UE attaches to the first network and a second network, wherein the second UE capability is different from the first UE capability. That is, the UE transmits its UE capability according to the number of networks the UE attaches to.

In one example, when the UE (e.g., only) attaches to the first network, the UE may (e.g., only) operate a single radio stack (e.g. LTE stack). When the UE attaches to the first network and the second network, the UE may operate two radio stacks. One is for communicating with the first network, and the other is for communicating with the second network. Thus, the UE (determines to) transmit the first UE capability to the first network, when the UE (e.g., only) operates the single radio stack. The UE (determines to) transmit the second UE capability to the first network, when the UE operates the two radio stacks, wherein the second UE capability is different from the first UE capability.

In one example, the UE may initially attach to the first network, when a first USIM is inserted into the UE or when the first USIM is activated by the UE (e.g., the UE with the first USIM is powered on or an airplane/flight mode of the UE is turned off). Then, the UE transmits the first UE capability to the first network. Later, a second USIM may be inserted into the UE or may be activated by the UE while the first USIM has been inserted or activated. The UE may attach to the second network with the second USIM, when the second USIM is inserted to the UE or is activated by the UE while the first USIM has been inserted and activated. In response to the insertion or activation of the second USIM, the UE transmits the second UE capability to the first network, to update the first UE capability to the second UE capability. When the UE attaches to the second network, the UE may transmit a third UE capability to the second network.

In one example, the UE initially attaches to the first network, when a first USIM is inserted into the UE or when the first USIM is activated by the UE. Then, the UE transmits a first UL category and a first DL category (e.g., in the RRC message or the NAS message) to the first network. Later, a second USIM may be inserted into the UE or activated by the UE while the first USIM has been inserted or activated. The UE may attach to the second network with the second USIM, when the second USIM is inserted to the UE or is activated by the UE while the first USIM has been inserted or activated. In response to the insertion or activation of the second USIM, the UE transmits a second UL category and a second DL category (e.g. in the RRC or NAS message) to the first network, to update the first UL category and the first DL category respectively. When the UE attaches to the second network, the UE may transmit a third UL category and a third DL category (e.g. in the RRC or NAS message) to the second network.

In one example, to transmit the second UE capability to the first network, the UE may perform or initiate a detach procedure with the first network by transmitting a DETACH REQUEST message to the first network and then may perform an attach procedure by transmitting an ATTACH REQUEST message. In one example, to transmit the second UE capability to the first network, the UE may perform or initiate a tracking area update procedure with the first network by transmitting a TRACKING AREA UPDATE REQUEST message to the first network without performing a detach procedure before the tracking area update procedure. In one example, to transmit the second UE capability to the first network, the UE may perform or initiate an attach procedure with the first network by transmitting an ATTACH REQUEST message to the first network without performing a detach procedure before the attach procedure. The network may transmit a UE Capability Enquiry message to the UE during/after/in response to the attach procedure or the tracking area update procedure. The UE may transmit the UE Capability Information message including the second UE capability, in response to the UE Capability Enquiry message.

In one example, to transmit the second UE capability to the first network, the UE may directly transmit the UE Capability Information or the UE Capability Indication message to the first network without performing the attach procedure and the tracking area update procedure.

The UE capability above may comprise at least one of a CA capability, a DC capability, a MIMO capability, and a UE category. Each of the first capability, the second capability and the third UE capability may indicate a capability for a function. The function may be the CA, DC, MIMO or UE category described above.

In one example, the UE (determines to) attaches to the first network according to a first USIM, and (determines to) attaches to the second network according to a second USIM which has an IMSI different from the first USIM.

In one example, the UE transmits a first ATTACH REQUEST message or a first TRACKING AREA UPDATE REQUEST message to the first network to attach to the first network, and transmits a second ATTACH REQUEST message or a second TRACKING AREA UPDATE REQUEST message to the second network to attach to the second network.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention brings benefits to the UE which has some hardware components shared for enabling simultaneous multiple cellular radio operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling multiple cellular radio operations, comprising:
   a storage device, for storing instructions of:
      transmitting a first user equipment (UE) capability to a first network, when the communication device attaches to the first network; and
      transmitting a second UE capability to the first network, when the communication device attaches to the first network and a second network, wherein the first UE capability indicates a third maximum number of CCs on which communication device simultaneously transmits transmission(s), and the second UE capability indicates a fourth maximum number of CCs on which the communication device simultaneously transmits transmission(s), wherein the third maximum number is equal to or greater than the fourth maximum number, and the fourth maximum number is equal to or greater than 1; and
   a processing circuit, coupled to the storage device, configured to execute the instructions stored in the storage device.

2. The communication device of claim 1, wherein the first UE capability comprises at least one of a first carrier aggregation (CA) capability, a first dual connectivity (DC) capability, a first multiple input multiple output (MIMO)

capability and a first UE category, and the second UE capability comprises at least one of a second CA capability, a second DC capability, a second MIMO capability and the second UE category.

3. The communication device of claim 1, wherein the first UE capability indicates a first maximum number of component carriers (CCs) on which the communication device simultaneously receives transmission(s), and the second UE capability indicates a second maximum number of CCs on which the communication device simultaneously receive transmission(s), wherein the first maximum number is greater than the second maximum number, and the second maximum number is greater than 1.

4. The communication device of claim 1, wherein the first UE capability indicates a first maximum number of MIMO layers for downlink (DL), and the second UE capability indicates a second maximum number of MIMO layers for DL, wherein the first maximum number is greater than the second maximum number.

5. The communication device of claim 1, wherein the first UE capability indicates a first UE category, and the second UE capability indicates a second UE category, wherein the second UE category indicates a lower capability than that of the first UE category.

6. The communication device of claim 4, wherein the storage device further stores the instruction of:
transmitting a third UE capability to the second network, when the communication device attaches to the first network and the second network, wherein the third UE capability indicates a lower capability than that of the first UE capability.

7. The communication device of claim 1, wherein the storage device further stores the instructions of:
attaching to the first network according to a first universal subscriber identity module (USIM); and
attaching to the second network according to a second USIM which has an International Mobile Subscriber Identity (IMSI) different from the first USIM.

8. The communication device of claim 1, wherein the storage device further stores the instructions of:
transmitting a first ATTACH REQUEST message or a first TRACKING AREA UPDATE REQUEST message to the first network, to attach to the first network; and
transmitting a second ATTACH REQUEST message or a second TRACKING AREA UPDATE REQUEST message to the second network, to attach to the second network.

9. A communication device for handling multiple cellular radio operations, comprising:
a storage device, for storing instructions of:
transmitting a first user equipment (UE) capability to a first network, when the communication device attaches to the first network, wherein the first UE capability indicates that the communication device supports a carrier aggregation (CA); and
transmitting a second UE capability to the first network and a second network, when the communication device attaches to the first network and the second network, wherein the second UE capability indicates that the communication device does not support the CA, wherein the first UE capability indicates a first maximum number of CCs on which the communication device simultaneously receives transmission(s), and the first UE capability indicates a second maximum number of CCs on which the communication device simultaneously transmits transmission(s), wherein the first maximum number is greater than 1, and the second maximum number is equal to or greater than 1; and
a processing circuit, coupled to the storage device, configured to execute the instructions stored in the storage device.

10. The communication device of claim 9, wherein the second UE capability does not comprise a CA capability and a dual connectivity (DC) capability.

11. The communication device of claim 9, wherein the storage device further stores the instructions of:
transmitting a first multiple input multiple output (MIMO) capability to a first network, when the communication device attaches to the first network; and
transmitting a second MIMO capability to the first network, when the communication device attaches to the first network and a second network, wherein the second MIMO capability is different from the first MIMO capability;
wherein the first MIMO capability indicates a first maximum number of MIMO layers for a downlink (DL) or an uplink (UL), and the second MIMO capability indicates a second maximum number of MIMO layers for the DL or the UL;
wherein the first maximum number is greater than the second maximum number, and the second maximum number is greater than 1; and
a processing circuit, coupled to the storage device, configured to execute the instructions stored in the storage device.

12. The communication device of claim 9, wherein the storage device further stores the instructions of:
attaching to the first network according to a first universal subscriber identity module (USIM); and
attaching to the second network according to a second USIM which has an International Mobile Subscriber Identity (IMSI) different from the first USIM.

13. The communication device of claim 9, wherein the storage device further stores the instructions of:
transmitting a first ATTACH REQUEST message or a first TRACKING AREA UPDATE REQUEST message to the first network, to attach to the first network; and
transmitting a second ATTACH REQUEST message or a second TRACKING AREA UPDATE REQUEST message to the second network, to attach to the second network.

14. A method for handling multiple cellular radio operations of a communication device, comprising:
transmitting a first user equipment (UE) capability to a first network, when the communication device attaches to the first network; and
transmitting a second UE capability to the first network, when the communication device attaches to the first network and a second network, wherein the second UE capability is different from the first UE capability, wherein the first UE capability indicates a third maximum number of CCs on which communication device simultaneously transmits transmission(s), and the second UE capability indicates a fourth maximum number of CCs on which the communication device simultaneously transmits transmission(s), wherein the third maximum number is equal to or greater than the fourth maximum number, and the fourth maximum number is equal to or greater than 1.

15. The method of claim 14, wherein the first UE capability comprises at least one of a first carrier aggregation (CA) capability, a first dual connectivity (DC) capability, a first multiple input multiple output (MIMO) capability and a first UE category, and the second UE capability comprises at least one of a second CA capability, a second DC capability, a second MIMO capability and the second UE category.

16. The method of claim 14, wherein the first UE capability indicates a first maximum number of component carriers (CCs) on which the communication device simultaneously receives transmission(s), and the second UE capability indicates a second maximum number of CCs on which the communication device simultaneously receive transmission(s), wherein the first maximum number is greater than the second maximum number, and the second maximum number is greater than 1.

17. The method of claim 14, wherein the first UE capability indicates a first maximum number of MIMO layers for downlink (DL), and the second UE capability indicates a second maximum number of MIMO layers for DL, wherein the first maximum number is greater than the second maximum number.

* * * * *